Oct. 8, 1940.                A. C. SINCLAIR                2,216,963
              MEANS FOR CUTTING WINDOWS IN WELL CASINGS
                     Filed Oct. 9, 1939         2 Sheets-Sheet 1
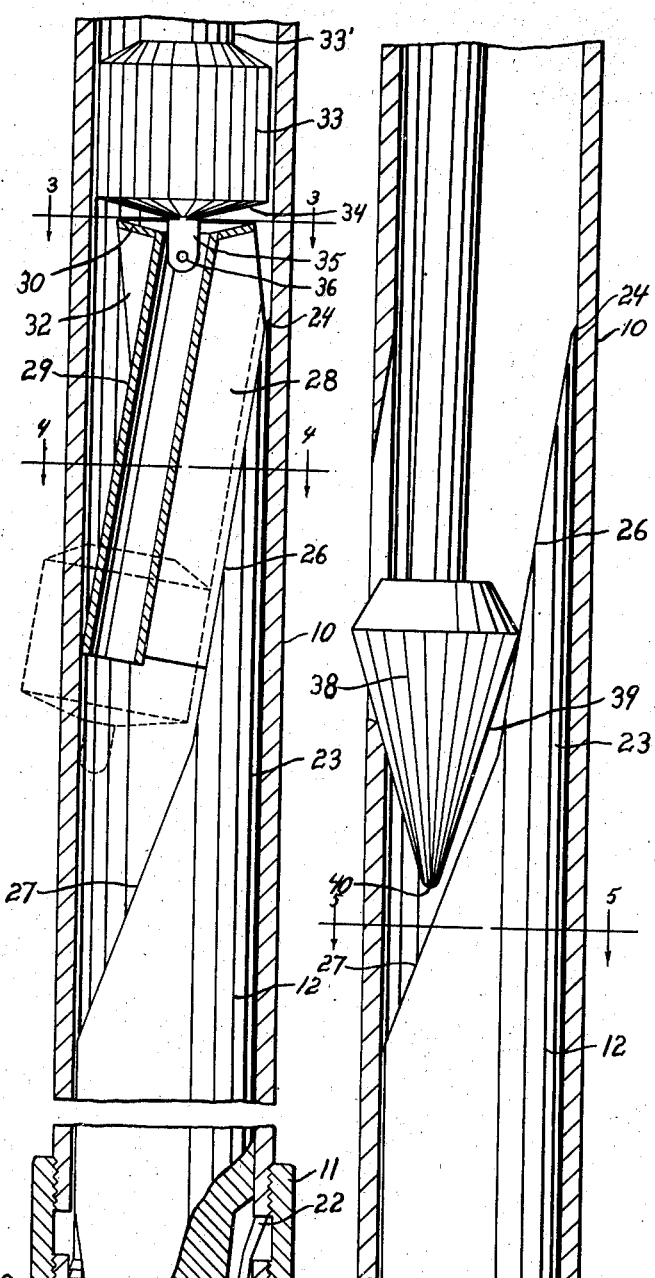
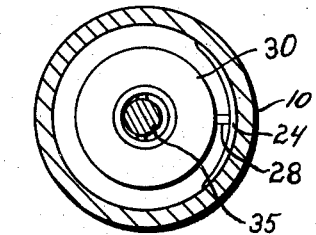
Fig 3
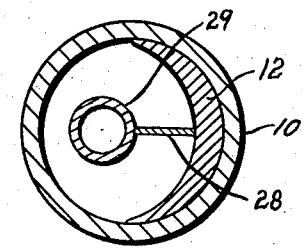
Fig 4
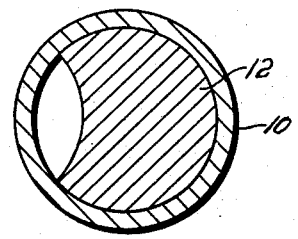
Fig 5
Inventor
ALFRED C. SINCLAIR
By Jack A. Ashley
          Attorney Oct. 8, 1940.  A. C. SINCLAIR  2,216,963
MEANS FOR CUTTING WINDOWS IN WELL CASINGS
Filed Oct. 9, 1939  2 Sheets-Sheet 2
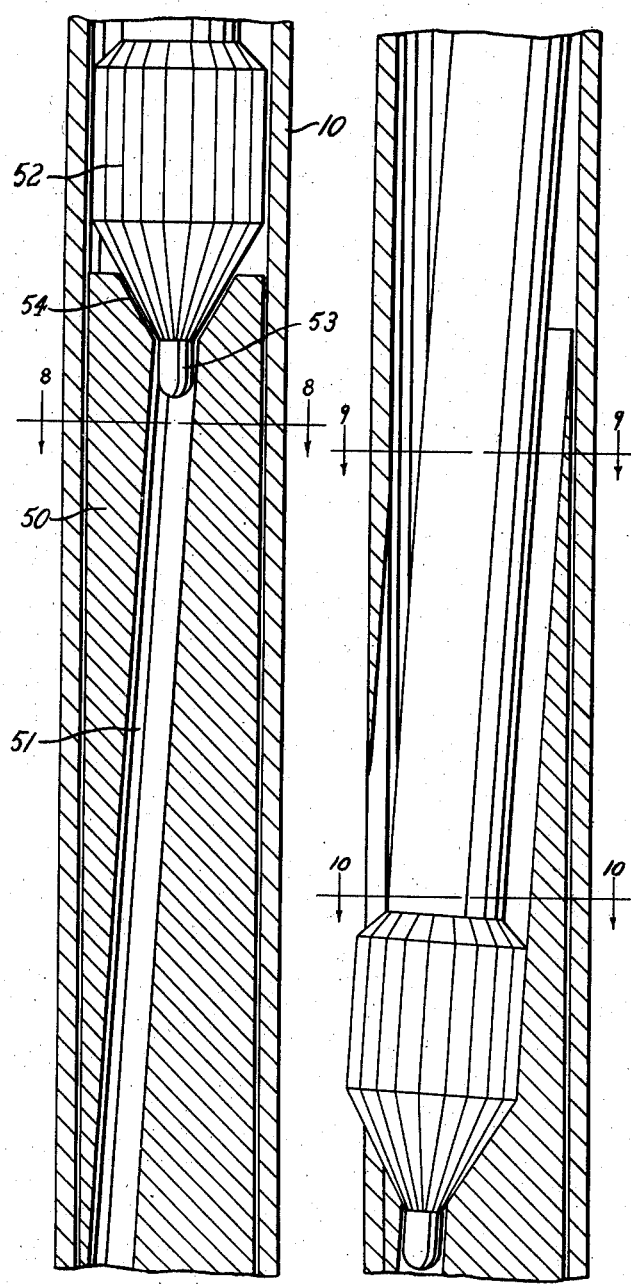
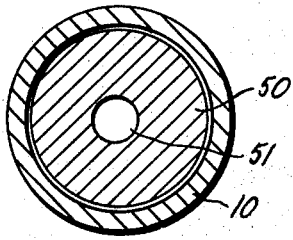
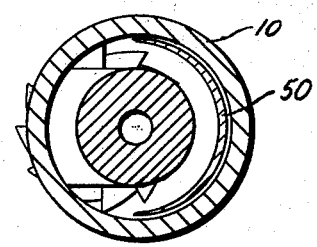
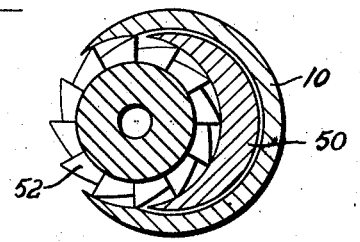
Inventor
ALFRED C. SINCLAIR
By Jack A. Ochley
Attorney Patented Oct. 8, 1940

2,216,963

UNITED STATES PATENT OFFICE 2,216,963

MEANS FOR CUTTING WINDOWS IN WELL CASINGS

Alfred C. Sinclair, Houston, Tex., assignor to Joseph E. Sinclair, Houston, Tex.

Application October 9, 1939, Serial No. 298,717

4 Claims. (Cl. 255—1)

This invention relates to new and useful improvements in means for cutting windows in well casings.

In modern well drilling operations, the well hole often becomes clogged or blocked for some reason. This may be due to tools that have been lost in the well hole and cannot be fished out, or it may be due to tubing that has become stuck in the well hole and cannot be loosened. In cases such as these, it is desirable to start a new or branch hole off from the old hole at an angle and slightly above the blocked portion, so that said blocked portion is avoided, and at the same time as much as possible of the old, or previously drilled, well hole is utilized. There are also certain other cases in which it is desirable to drill a well hole at an angle or to drill a new hole off at an angle from the old hole.

Previously, it has been the practice to use a whipstock to guide the drill bit in cutting through the casing and starting the new hole. In many instances the drill bit or mill used for this operation cut the face of the whipstock, while said whipstock was engaged in guiding said mill, to such an extent that the process was rendered tedious and unreliable. Also, as soon as a portion of the casing window was cut, the mill was no longer held against eccentric and random movements. Such eccentric movements of the mill caused considerable damage to the casing and the new hole being started.

One object, therefore, of this invention is to provide improved means for cutting windows in well casings, wherein the cutting mill is guided in its cutting path and prevented from eccentric or random movements, whereby the casing and the newly started hole are protected against damage from such movements.

Another object of this invention is to provide means for cutting windows in well casings, wherein the cutting mill is guided in its path and cuts or mills out the guiding means as said mill passes downwardly.

A further object of this invention is to provide improved means for cutting windows in well casings, wherein the cutting mill is provided with a nipple or pilot finger on its bottom surface, said finger engaging in a tubular member whereby said finger prevents the mill from wobbling or digressing from its proper path and allows the mill to cut away the tubular member as it passes downwardly.

A construction designed to carry out the invention will be hereinafter described, together with other features of the invention.

The invention will be more readily understood from a reading of the following specification and by reference to the accompanying drawings, in which an example of the invention is shown, and wherein:

Figure 1 is a view, partly in section and partly in elevation, showing a construction for carrying out the invention, Figure 2 is a similar view showing the finishing cutter engaging the casing wall, Figure 3 is a horizontal cross-sectional view taken on the line 3—3 of Figure 1, Figure 4 is a similar view taken on the line 4—4 of Figure 1, Figure 5 is also a similar view taken on the line 5—5 of Figure 2, Figure 6 is a vertical, sectional view showing a modified form of the invention, Figure 7 is a similar view showing the same form, the window being partially cut in the casing wall, Figure 8 is a horizontal cross-sectional view taken on the line 8—8 of Figure 6, Figure 9 is a similar view taken on the line 9—9 of Figure 7, and Figure 10 is a horizontal cross-sectional view taken on the line 10—10 of Figure 7.

In the drawings the numeral 10 designates a well casing such as is mounted within well bores and through which it is desired to cut a side window. As in all casing strings, the lengths of casing 10 are joined by coupling collars 11, and a suitable whipstock body or mandrel 12 is mounted within said casing. It is pointed out that any desirable means may be used to secure the mandrel within the casing, and that the means shown in Figure 1 is illustrative only. In cutting a side window through a casing, it is preferable not to drill through a coupling collar because the extra thickness of the metal in the collar would only make the cutting job more difficult. Therefore, the anchoring means for the mandrel is so designed as to be actuated by a coupling collar in such a manner that the latter is avoided, and not alowed to fall in the path to be cut.

As shown in Figure 1, the mandrel fits snugly within the bore of casing 10, and is held securely in this position by setting means 13 located in the circular bottom portion thereof. The setting means 13 includes a downwardly tapered surface 14 located at one side and near the bottom of the mandrel 12. Suitable casing engaging slips 15 are mounted on the surface 14 and rest upon the left-hand end of a lever arm 16. The lever arm 16 is pivotably mounted within a transverse horizontal groove 17 in the bottom of the mandrel by means of a pin 18, and is free to swing in a vertical plane. The right-hand end of lever arm 16 carries a pin 19 by which said arm is connected to the lower end of an actuating finger 20. The finger 20 is disposed within a vertical groove 21 cut in the side of the mandrel, and has its upper end 22 curving outwardly toward the inside wall of the casing 10. After the mandrel has been lowered into the well hole, the subsequent raising of said mandrel will cause the upper end 22 of finger 20 to engage in the joint formed by a coupling collar, as shown in Figure 1.

Manifestly, upon further upward movement of the mandrel, the finger will be held against movement, and thereby swing the lever arm 16, and cause slips 15 to move upwardly. As the slips move upwardly, they are forced, by the taper of surface 14, into engagement with the inside wall of casing 10. Subsequent downward pressure on the mandrel will serve only to force the slips into more intimate engagement with the casing, whereby downward movement of the mandrel is prevented. Thus, the mandrel is securely positioned within the well casing.

The upper portion 23 of the mandrel is made in the form of an elongate concavo-convex wedge having an apex 24 and an inclined concaved bearing surface 25. The bearing surface 25 extends downwardly from the apex 24 to the opposite wall of said casing. It is pointed out that the bearing surface may be formed with two or more different slopes or inclines 26 and 27, the slope 27 being of greater pitch and located at the bottom or lower portion of said surface. An elongate web or fin 28 is welded or otherwise fastened to the mandrel in an axial plane normal to the upper surface 26, and carries a tubular member 29 fastened in the same axial plane along its outer edge. The tubular member 29 may be welded or otherwise fastened to web 28, as is desired or deemed suitable. The upper end of the tubular member is surrounded with a dished collar 30 which overhangs and is fastened upon the upper edge of the web 28. If desired, the collar may be additionally supported and braced by a short web 32 which is secured to the outside of the tubular member and the under surface of the collar, substantially diametrically opposite the web 28.

The cutting mill 33 is suspended in the well by a tubing string 33' and may be of any desired type, although it is preferable that it have a frusto-conical bottom or under surface 34, as shown in Figure 1. The mill has axial pilot pin 35 projecting from its bottom, and a transverse opening 36 extends through the lower portion of said pin which projects into the upper end of the tubular member 29, being guided thereinto by the collar 30. Similar openings (not shown) are provided in the upper portion of the tubular member in transverse alinement with the opening 36 and a shear pin 37 is passed therethrough. The shear pin is of sufficient strength for the mill to support the mandrel 12 while the assembly is being lowered to the desired point within the well casing, and to permit the mandrel to be set within the casing by setting means 13, as hereinbefore described. Since the rotation of the tubing 33' and the mill 33 will cause the mandrel to rotate, it is possible to position the mandrel within the well casing, so that a window may be cut in any desired direction. As pressure is applied to the mill to set the mandrel, and the mandrel is set, the shear pin 37 will be fractured, whereby the pin 35 will telescope the tubular member and the bottom of the mill will rest upon the collar 30. The device is then ready to cut a window in the casing 10.

As the mill is rotated under pressure, it will cut away collar 30 and commence cutting the tubular member and the webs 32 and 28. Owing to the pilot pin 35, the axis of the mill will be alined with the tubular member 29 as the milling progresses. At the same time it will start cutting the casing wall. The mill will be continually guided in its downward progress by the tubular member, and will be prevented thereby from wobbling and undergoing random movements. The mill 33 will cut down to the position shown in dotted lines in Figure 1, at which point it will have cut the tubular member completely away and partially completed the cutting of the window. When the work has been done, the mill 33 and its support are removed from the well hole and replaced by mill 38 shown in Figure 2.

Mill 38, shown in Figure 2, has its cutting surface 39 tapered acutely downwardly to a pointed end 40. The pointed end 40 projects between the remaining uncut wall of the casing and the lower surface 27 of mandrel 12, and is thus supported so as to reduce the wobbling action of the mill, which prevents it from damaging the casing and the side wall of the newly-formed well hole. The cutting operation is completed with mill 38, and the new well hole is ready to be drilled further by the usual earth-drilling bits (not shown). It is pointed out, that mill 33 and mill 38 each have the same overall outside diameter, so that the opening cut by each is substantially the same diameter.

A modified form of the invention is shown in Figures 6 through 10, inclusive. This form of the invention is similar to the first form with the exception that the mandrel 50 is substantially circular in cross-section throughout. A longitudinal bore 51 extends through mandrel 50 and inclines from the center of the mandrel at the top, to one side of the mandrel near its lower end, where said opening emerges from one side wall of said mandrel. A cutting mill 52 similar to mill 33 is used, having an axial pilot pin 53 which fits within said bore 51 and guides and holds the mill thereby in its cutting path. The upper portion of bore 51 is flared outwardly to form a bowl 54 which serves, as the collar 30, to guide the pilot pin into engagement within bore 51. In this form of the invention, the cutting mill must cut away the entire opening through the mandrel as well as cut the casing wall. Thus, as shown in Figure 7, when the mill has cut to the lower portion of the mandrel, it has cut a passage through the body of the mandrel as well as cut the casing window. It is pointed out that the mandrel 50 may be connected to the mill 52 by a shear pin (not shown) as in the first form of the invention, or any other suitable means may be utilized, since the mill may be lowered into the well separately. This may be done because the bowl 54 serves to guide pilot pin 53 into engagement with bore 51.

It may readily be seen that these two forms of the invention constitute only two of the many structures by which this window cutting operation may be carried out. The invention is not to be limited to these forms, but includes any structure in which an axial finger on the end of the cutting mill is engaged by a longitudinal opening and is guided therein, whereby said finger guides the cutting mill in its downward path.

Various changes, alterations and modifications may be made in the size, shape and arrangement of the herein described elements, within the scope of the appended claims.

What I claim and desire to secure by Letters Patent is:

1. A casing window cutting device including a mandrel having an inclined tubular bore, a cutter, and a pilot carried by and depending from the cutter, and having its longitudinal axis in register with the longitudinal axis of the cutter, said pilot being of such length and the bore of such diameter so that upon entry of the pilot into the bore the pilot will effect initial axial alinement of the cutter with respect to the mandrel and upon cutting of the cutter cause angular movement of the cutter, until the cutter axis is substantially at the same inclination as the bore of the mandrel.

2. A casing window cutting device in accordance with claim 1, wherein there is an outwardly and upwardly flared guiding means at the upper end of the bore of the mandrel so as to engage the pilot and guide the latter and thereby the cutter into the bore of the mandrel.

3. A casing window cutting device in accordance with claim 1, wherein the mandrel has its upper portion cut-away, wherein there is a tubular mmber which forms the bore of the mandrel, and wherein there is a web-like connection between the periphery of the tubular member and the adjacent wall defining the cut-away portion of the mandrel.

4. A casing window cutting device in accordance with claim 1, wherein the mandrel has its upper portion cut-away; wherein the bore of the mandrel is formed of a tubular member which has an outwardly flared cup-like member at its upper end; wherein there is a web-like member connected to the periphery of the tubular member and to the adjacent wall defining the cut-out of the mandrel, and wherein there is a web connected to the underface of the cup-like member and to the periphery of the tubular member and which is located substantially opposite to the web-like member.

ALFRED C. SINCLAIR.